(12) United States Patent
Zhang et al.

(10) Patent No.: US 12,050,382 B2
(45) Date of Patent: Jul. 30, 2024

(54) LIGHT EMITTING MODULE AND DISPLAY MODULE

(71) Applicants: Beijing BOE Display Technology Co., Ltd., Beijing (CN); BOE Technology Group Co., Ltd., Beijing (CN)

(72) Inventors: Enliang Zhang, Beijing (CN); Haijun Shi, Beijing (CN); Bin Wu, Beijing (CN); Bochang Wang, Beijing (CN); Changjia Fu, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/768,319

(22) PCT Filed: Mar. 1, 2021

(86) PCT No.: PCT/CN2021/078502
§ 371 (c)(1),
(2) Date: Apr. 12, 2022

(87) PCT Pub. No.: WO2022/183332
PCT Pub. Date: Sep. 9, 2022

(65) Prior Publication Data
US 2023/0400732 A1    Dec. 14, 2023

(51) Int. Cl.
*G02F 1/13357* (2006.01)
*G02F 1/1335* (2006.01)

(52) U.S. Cl.
CPC .. *G02F 1/133611* (2013.01); *G02F 1/133603* (2013.01); *G02F 1/133606* (2013.01); *G02F 1/133613* (2021.01)

(58) Field of Classification Search
CPC ......... G02F 1/133603; G02F 1/133611; G02F 1/133613; G02F 1/133615; G02F 1/133606; F21Y 2107/00; F21Y 2107/50
See application file for complete search history.

(56) References Cited

U.S. PATENT DOCUMENTS

| | | | | |
|---|---|---|---|---|
| 10,101,610 B2* | 10/2018 | Kang | ................ | G02F 1/133603 |
| 2009/0052174 A1* | 2/2009 | Tsai | ................... | G02F 1/133603 |
| | | | | 362/247 |

(Continued)

FOREIGN PATENT DOCUMENTS

| CN | 201017137 Y | 2/2008 |
|---|---|---|
| CN | 102818197 A | 12/2012 |

(Continued)

OTHER PUBLICATIONS

PCT/CN2021/078502 international search report.
PCT/CN2021/078502 Written Opinion.

*Primary Examiner* — Erin Kryukova
(74) *Attorney, Agent, or Firm* — IPro PLLC

(57) ABSTRACT

A light emitting module and a display module. The light emitting module includes a light source (112) assembly (11); the light source (112) assembly (11) includes a substrate (111) and light sources (112), and the light sources (112) are located on the substrate (111). The substrate (111) includes a first area (Q1) and a second area (Q2), the first area (Q1) surrounds the second area (Q2), and the light emitting surfaces of the light sources (112) located in the first area (Q1) are inclined and face the second area (Q2). With the light emitting module, the light emitted by the light sources (112) located at the edge can be inclined toward the center of the light emitting module, which can reduce the light at the edge of the light emitting module, thereby reducing the (Continued)

light leakage phenomenon at the edge of the light emitting module, which is beneficial to improve the display quality.

15 Claims, 8 Drawing Sheets

(56) References Cited

U.S. PATENT DOCUMENTS

| | | | |
|---|---|---|---|
| 2011/0242794 A1 | 10/2011 | Nakamura et al. | |
| 2014/0029242 A1 | 1/2014 | Zheng et al. | |
| 2014/0368768 A1* | 12/2014 | Sakai | G02F 1/133606 |
| | | | 349/64 |
| 2016/0330838 A1* | 11/2016 | Park | G02F 1/133603 |
| 2019/0041683 A1* | 2/2019 | Jo | C09J 11/08 |

FOREIGN PATENT DOCUMENTS

| | | | | |
|---|---|---|---|---|
| CN | 202647490 U | | 1/2013 | |
| CN | 109683396 A | | 4/2019 | |
| CN | 109782489 A | * | 5/2019 | |
| CN | 109782489 A | | 5/2019 | |
| CN | 114153093 A | * | 3/2022 | |
| KR | 20070108712 A | * | 11/2007 | |
| KR | 20130070441 A | * | 6/2013 | |
| KR | 20130110944 A | * | 10/2013 | |
| WO | WO-2012060255 A1 | * | 5/2012 | F21S 2/00 |
| WO | WO-2012096204 A1 | * | 7/2012 | G02B 6/003 |

* cited by examiner

LIGHT EMITTING MODULE AND DISPLAY MODULE

CROSS-REFERENCE TO RELATED APPLICATIONS

The present application is a U.S. National Phase of International Application No. PCT/CN2021/078502, entitled "LIGHT EMITTING MODULE AND DISPLAY MODULE", and filed on Mar. 1, 2021. The entire contents of each of the above-listed applications are hereby incorporated by reference for all purposes.

TECHNICAL FIELD

The present disclosure relates to the field of display technologies, and in particular to a light emitting module and a display module.

BACKGROUND

In the related art, a light emitting module is an important part of a liquid crystal display device, and the light emitting module is used to provide sufficient and uniform surface light sources for the liquid crystal display device. Generally, light emitting modules are classified into side-entry light emitting modules and direct-lighting light emitting modules, wherein the direct-lighting light emitting modules can include a plastic frame, a back plate, light sources, a diffuser plate, an optical film, and the like. The light sources are located under the diffuser plate. The light emitted by the light sources is transmitted through the diffusion plate and irradiated on the liquid crystal display panel. However, some of the light emitted by the light sources will leak from a gap between the frame of the light emitting module and the diffuser plate, resulting in significant light leakage around the edge of the display device when the display device is displayed normally, which can greatly reduce the display quality of the display device.

SUMMARY

The present disclosure provides an array substrate and a display device.

According to a first aspect of the embodiments of the present disclosure, there is provided a light emitting module, including: a light source assembly;
wherein the light source assembly includes a substrate and light sources, the light sources are located on the substrate, the substrate includes a first area and a second area, the first area surrounds the second area, and light emitting surfaces of the light sources located in the first area are inclined and face the second area.

In one embodiment, the light emitting module further includes an optical film layer; wherein the optical film layer is located on a light exit side of the light source assembly, and is configured to modulate light emitted by the light source assembly;
the light sources are located on a side of the substrate facing the optical film layer;
the light emitting surfaces of the light sources located in the second area face the optical film layer and are parallel to a surface of the substrate facing the optical film layer;
on the same side of the substrate, for each of the light sources located in the second area and adjacent to a junction of the first area and the second area, a first distance between a first vertex of the light source close to the first area and a surface of the optical film layer facing the light source along a direction perpendicular to the substrate, a second distance between a projection of the first vertex on the optical film layer and a first edge of the optical film layer, and a light emission angle of the light source satisfy the following relationship $$\arctan(a/b) \geq \varphi/2$$

where a is the second distance, b is the first distance, and $\varphi$ is the light emission angle of the light source.

In one embodiment, $a > \sqrt{3}b$.

In one embodiment, on the same side of the substrate in the first area, in a direction that a first boundary of the first area away from the second area points to a second boundary of the second area, at least two rows of light sources are provided, where the first boundary and the second boundary are adjacent to each other and extend in the same direction;
in the first area, an inclination angle of a light emitting surface of a light source close to the first boundary is larger than an inclination angle of a light emitting surface of a light source away from the first boundary.

In one embodiment, in the first area, two rows of light sources are provided in a direction from the first boundary to the second boundary.

In one embodiment, the second area is rectangular;
in the first area, in each row of light sources, the light sources located on an extension line of a diagonal of the second area are inclined toward a center of the second area, and the remaining light sources are inclined toward the center of the second area along a central axis of the second area, where the central axis is perpendicular to a extending direction of the row where the light sources are located.

In one embodiment, on the same side of the substrate, in the first area, a third distance between a projection of an end of the light source close to the first boundary on the optical film layer and a first edge of the optical film layer, a fourth distance between a second vertex of the light source in the first area close to the first boundary and a surface of the optical film layer facing the light source along the direction perpendicular to the substrate, a light emission angle of the light source, and an inclination angle of the light emitting surface of the light source satisfy the following relationship:

$$\arctan(c/d) + \psi = \varphi/2$$

where c is the third distance, d is the fourth distance, w is the inclination angle of the light emitting surface of the light source, and $\varphi$ is the light emission angle of the light source.

In one embodiment, the optical film layer includes a diffusion layer, the light emitting module further includes a back plate, a plastic frame, and an adhesive layer, and the light source assembly is located between the back plate and the diffusion layer, and on a side of the back plate facing the diffusion layer;
the plastic frame is located on the back plate, and the adhesive layer is located between the diffusion layer and the plastic frame;
the adhesive layer is made of an opaque material.

In one embodiment, the light sources are configured to emit light of a first wavelength;
the optical film layer further includes a light conversion layer, the light conversion layer is located on a side of the diffusion layer close to the light sources, and is configured to convert the light of the first wavelength into light of a second wavelength and light of a third wavelength and allow part of the light of the first wavelength to pass through, so that mixed light of the light of the first wavelength, the light of the second wavelength and the light of the third wavelength transmitted through the light conversion layer is white light.

In one embodiment, the light conversion layer includes quantum dot material.

In one embodiment, the light emitting module further includes a water-oxygen barrier layer; the water-oxygen barrier layer is located between the diffusion layer and the adhesive layer, and between the light conversion layer and the adhesive layer.

In one embodiment, the light emitting module further includes a brightness enhancement film located on a side of the optical film layer away from the light source.

In one embodiment, the light source assembly further includes a bracket and a circuit board, the circuit board is located between the substrate and the light sources, and the bracket is located between the circuit board and the light sources.

In one embodiment, a height of a first end of the bracket is lower than a height of a second end, so that the light emitting surfaces of the light sources are inclined; and/or,
the light source assembly further includes a conductive pad located below the second end of the bracket, so that the light emitting surfaces of the light sources are inclined.

In one embodiment, a surface of the substrate in the first area close to the light sources is located in the same plane as a surface of the substrate close to the light sources in the second area.

According to a first aspect of the embodiments of the present disclosure, there is provided display module, including: the light emitting module described above and a display panel, wherein the display panel is located on a side of the light emitting module away from the light source assembly.

DETAILED DESCRIPTION OF THE EMBODIMENTS

In order to make the above objects, features and advantages of the present disclosure more clearly understood, the specific embodiments of the present disclosure will be described in detail below with reference to the accompanying drawings.

An embodiment of the present disclosure provides a light emitting module. The light emitting module, as shown in FIG. 1, includes: a light source assembly 11.

Figure 1:
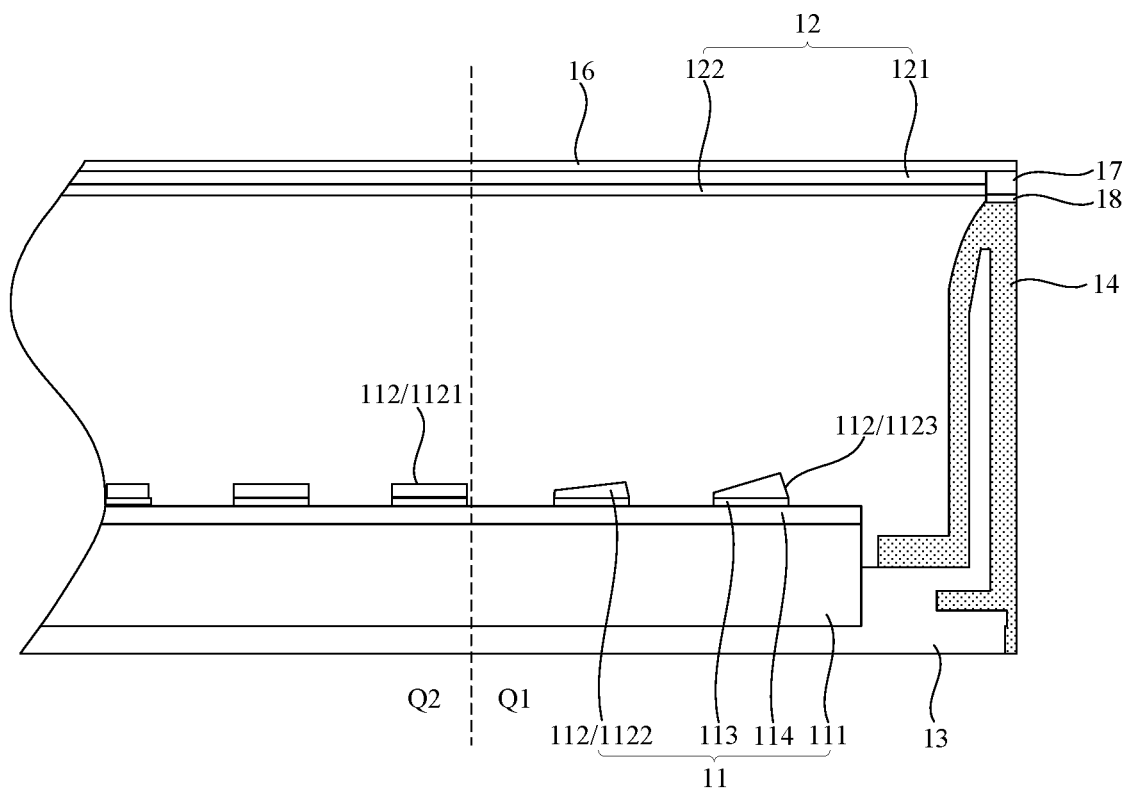
FIG. 1 is a schematic structural diagram of a light emitting module according to an embodiment of the present disclosure.

As shown in FIG. 1, the light source assembly 11 includes a substrate 111 and light sources 112, and the light sources 112 are located on the substrate 111.

Figure 2:
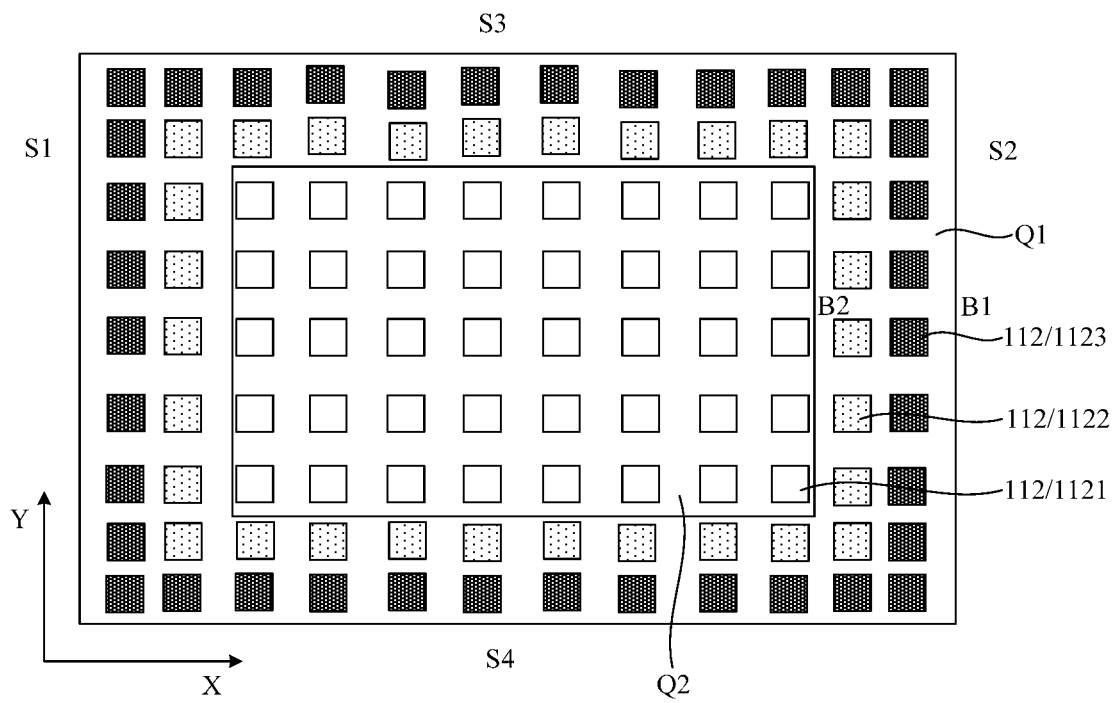
FIG. 2 is a schematic structural diagram of another light emitting module according to an embodiment of the present disclosure.

As shown in FIG. 1 and FIG. 2, the substrate 111 includes a first area Q1 and a second area Q2, the first area Q1 surrounds the second area Q2, light emitting surfaces of the light sources 112 located in the first area Q1 are inclined and face the second area Q2.

In this embodiment, since the first area Q1 surrounds the second area Q2, and the light emitting surfaces of the light sources 112 located in the first area Q1 are inclined and face the second area Q2, the light emitted by the light sources 112 located at the edge can be inclined toward the center of the light emitting module, which can reduce the light at the edge of the light emitting module, thereby reducing the light leakage phenomenon at the edge of the light emitting module, which is beneficial to improve the display quality.

The light emitting module provided by the embodiment of the present disclosure has been briefly introduced above, and the light emitting module provided by the embodiment of the present disclosure will be described in detail below.

The embodiment of the present disclosure also provides a light emitting module. The light emitting module, as shown in FIG. 1, includes a light source assembly 11, an optical film layer 12, a back plate 13, a plastic frame 14, a brightness enhancement film 16, a water-oxygen barrier layer 17 and an adhesive layer 18.

In this embodiment, as shown in FIG. 1, the light source assembly 11 is located between the back plate 13 and the optical film layer 12, and is located on a side of the back plate 13 facing the optical film layer 12. A light exit side of the light source assembly 11 faces the optical film layer 12, that is, the optical film layer 12 is located on the light exit side of the light source assembly 11. The optical film layer 12 is configured to modulate the light emitted by the light source assembly 11, for example, modulating the light emitted by the light source assembly 11 includes any one or combination of diffusing the light emitted by the light source assembly 11 to make the light output uniform and adjusting a wavelength of the light emitted by the light source assembly 11.

In this embodiment, as shown in FIG. 1, the light source assembly 11 includes a substrate 111, light sources 112, a bracket 113 and a circuit board 114. The substrate 111 is located on a side of the back plate 13 facing the optical film layer 12, and is used to support the circuit board 114 and the light sources 112, and can also protect the circuit board 114 and the light sources 112. The circuit board 114 includes conductive lines, and the conductive lines are electrically connected to the light sources 112 through the bracket 113. The bracket 113 plays a role of supporting and conducting electricity.

In this embodiment, as shown in FIG. 1 and FIG. 2, the light source assembly 11 includes a plurality of light sources 112, and the plurality of light sources 112 are arranged in an array on the substrate 111, and are located on a side of the substrate 111 facing the optical film layer 12. Each of the light sources 112 is used for emitting light of a first wavelength, for example, each of the light sources 112 is used for emitting blue light, but not limited thereto. For example, each of the light sources 112 can also be used to emit white light.

In this embodiment, the light sources 112 can be LED chips. The LED chips can be miniLED chips or microLED chips, but not limited thereto.

In this embodiment, as shown in FIG. 1 and FIG. 2, the substrate 111 includes a first area Q1 and a second area Q2, and the first area Q1 surrounds the second area Q2. That is, the first area Q1 is an edge area, and the second area Q2 is a central area. The second area Q2 is rectangular or approximately rectangular, and the outer edge of the first area Q1 is rectangular or approximately rectangular. The surface of the substrate 111 facing the light sources 112 in the first area Q1 and the surface of the substrate 111 facing the light sources 112 in the second area Q2 are located on the same plane. Compared with a solution where the two surfaces are not located on the same plane, the thickness of the substrate 111 can be made smaller. It is beneficial for the display panel to become thinner, and the material of the substrate 111 can be glass or metal, instead of being limited to metal, etc., and the processing difficulty of the substrate is relatively small.

In this embodiment, as shown in FIG. 1, the light emitting surface of the light source 1121 located in the second area Q2 faces the optical film layer 12 and is parallel to the surface of the substrate 111 facing the optical film layer 12. The light emitting surface of the light source is the surface on the light exit side of the LED chip.

Figure 3:
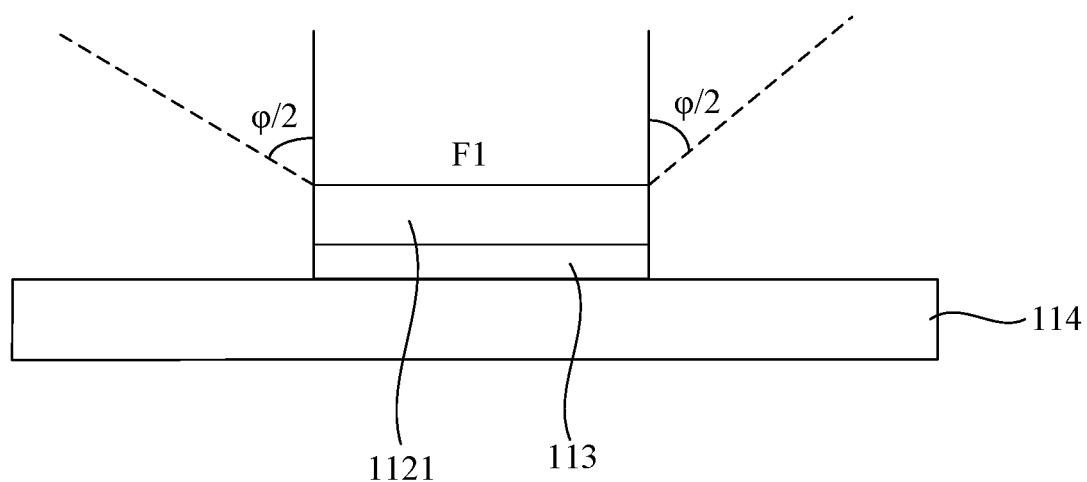
FIG. 3 is a schematic structural diagram of another light emitting module according to an embodiment of the present disclosure.

In this embodiment, as shown in FIG. 3, the light emitting surface F1 of the light source 1121 located in the second area Q2 is parallel to the surface of the substrate 111 facing the optical film layer 12. The surface of the substrate 111 facing the optical film layer 12 is parallel to the surface of the optical film layer 12 facing the substrate 111, that is, the light emitting surface F1 of the light source 1121 located in the second area Q2 is also parallel to the surface of the optical film layer 12 facing the substrate 111.

In this embodiment, as shown in FIG. 1, the light emitting surfaces of the light sources 112 located in the first area Q1 are inclined and face the second area Q2. In this way, the light emitted by the light sources 112 located at the edge of the light emitting module can be inclined toward the center of the optical film layer 12, thereby reducing the light at the edge of the optical film layer 12.

In this embodiment, as shown in FIG. 2, the surface of the substrate 111 facing the optical film layer 12 is rectangular or approximately rectangular. The substrate 111 includes a first side S1 and a second side S2 opposite to each other in the first direction X, and includes a third side S3 and a fourth side S4 opposite to each other in the second direction Y.

In the present embodiment, as shown in FIG. 2, on the same side of the substrate 111, for example, on the second side S2, in the first area Q1, in a direction that a first boundary B1 of the first area Q1 away from the second area Q2 points to a second boundary B2 of the second area Q2, there are at least two rows of light sources 112; where the first boundary B1 and the second boundary B2 are adjacent to each other and extend in the same direction. Lengths of space between the first boundary B1 and the second boundary B2 on the four sides of the substrate 111 can be the same, but not limited thereto. For example, on the second side S2 of the substrate 111, a length of a first space between the first boundary B1 and the second boundary B2 is a length of a space in the first direction X, and on the third side S3 of the substrate 111, a length of a second space between the first boundary B1 and the second boundary B2 is a length of a space in the second direction Y. The length of the first distance is equal to the length of the second distance.

In this embodiment, as shown in FIG. 1, on the same side of the substrate 111, in the first area Q1, an inclination angle of the light emitting surface of the light source 1123 close to the first boundary B1 is larger than an inclination angle of the light emitting surface of the light source 1122 away from the first boundary B1. The inclination angle of the light emitting surface is equal to an angle between the light emitting surface and a surface of the substrate 111 facing the optical film layer 12, or the inclination angle of the light emitting surface is equal to an angle between the light emitting surface and a surface of the optical film layer 12 facing the substrate 111. The angle between the light emitting surface and a surface of the substrate 111 facing the optical film layer 12 is an acute angle formed by the light emitting surface and the surface of the substrate 111 facing the optical film layer 12. The angle between the light emitting surface and the surface of the optical film layer 12 facing the substrate 111 is an acute angle formed by the light emitting surface and the surface of the optical film layer 12 facing the substrate 111.

In this embodiment, in the first area Q1, in the direction from the first boundary B1 to the second boundary B2, there are two rows of light sources 112, and the inclination angle of the light emitting surface of the light source 1123 close to the first boundary B1 is larger than the inclination angle of the light emitting surface of the light source 1122 away from the first boundary B1. When there are a plurality rows of light sources 112 in the first area Q1 in the direction from the first boundary B1 to the second boundary B2, as the distance from the light sources 112 to the first boundary B1 increases, the inclination angles of the light emitting surfaces of the light sources 112 decrease.

Figure 4:
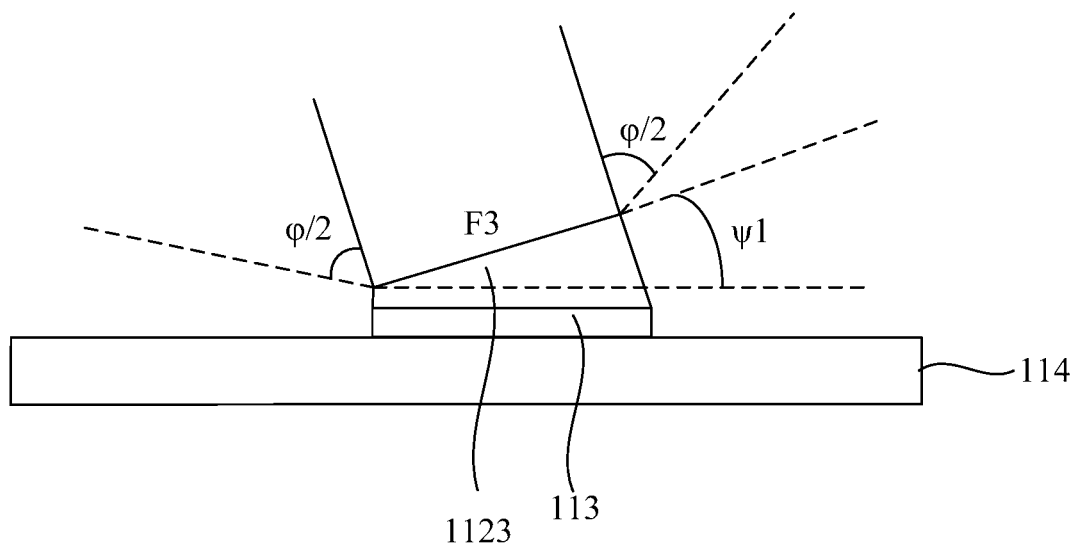
FIG. 4 is a schematic structural diagram of another light emitting module according to an embodiment of the present disclosure.
Figure 5:
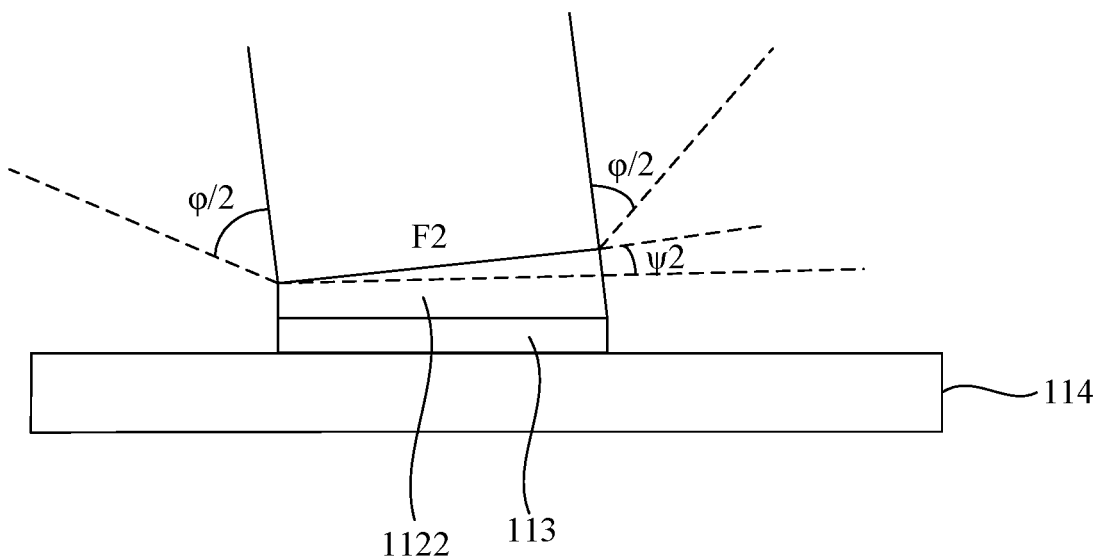
FIG. 5 is a schematic structural diagram of another light emitting module according to an embodiment of the present disclosure.

In this embodiment, as shown in FIG. 4, in the first area Q1, the inclination angle of the light emitting surface F3 of the light source 1123 close to the first boundary B1 is ψ1. As shown in FIG. 5, in the first area Q1, the inclination angle of the light emitting surface F2 of the light source 1122 away from the first boundary B1 is ψ2, and ψ1 is larger than ψ2. For example, ψ1 is equal to 13 degrees, and w2 is equal to 5 degrees, but not limited thereto.

In this embodiment, as shown in FIGS. 3 to 5, the heights of the brackets 113 of all the light sources 112 are the same. For example, it can be 0.2 mm. In the first area Q1, the distance between the highest point of the light emitting surface of the light source 1123 close to the first boundary B1 and the substrate 111 is 0.9 mm, and the distance between the highest point of the light emitting surface of the light source 1122 away from the first boundary B1 and the substrate 111 is 0.7 mm. In the second area Q2, the distance between the light emitting surface of the light source 1121 and the substrate 111 is 0.7 mm.

In this embodiment, the shapes and sizes of the light emitting surfaces of all light sources 112 are the same, for example, the shapes of the light emitting surfaces are all rectangular or approximately rectangular, the length of the light emitting surface is 1 mm, and the width of the light emitting surface is 0.5 mm, but not limited thereto.

Figure 6:
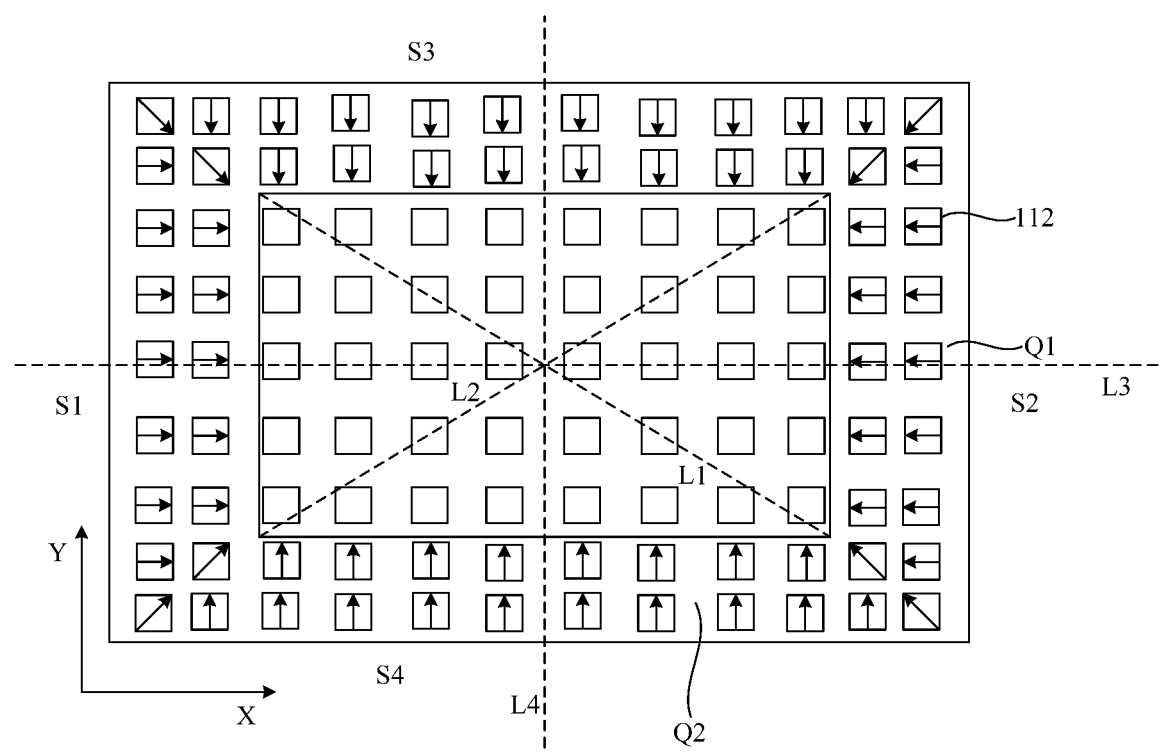
FIG. 6 is a schematic structural diagram of another light emitting module according to an embodiment of the present disclosure.

In this embodiment, as shown in FIG. 6, the diagonal lines of the second area Q2 include a first diagonal line L1 and a second diagonal line L2. The central axis of the second area Q2 includes a first central axis L3 and a second central axis L4. The first central axis L3 extends along the first direction X, and the second central axis L4 extends along the second direction Y.

In this embodiment, as shown in FIG. 6, in the first area Q1, in each row of light sources 112, the light sources 112 located on the extension line of the first diagonal line L1 of the second area Q2 and the light sources 112 located on the extension line of the second diagonal line L2 of the second area Q2 are inclined toward the center of the second area Q2, and the remaining light sources 112 are inclined toward the second area Q2 along one of the first central axis L3 and the second central axis L4, and the central axis is perpendicular to the extending direction of the row where the light sources 112 are located. The direction of the arrow in FIG. 6 represents the orientation of the light emitting surfaces of the light sources 112. For example, on the second side S2 of the substrate 111, for a row of light sources 112 in the first area Q1 close to the first boundary B1, there is no light sources 112 located on the extension line of the first diagonal line L1 and the second diagonal line L2, the row of light sources 112 in the first area Q1 close to the first boundary B1 are inclined toward the second area Q2 along the first central axis L3. In this way, the mixed light can be made more uniform, and bright lines at the corners can be avoided.

Figure 7:
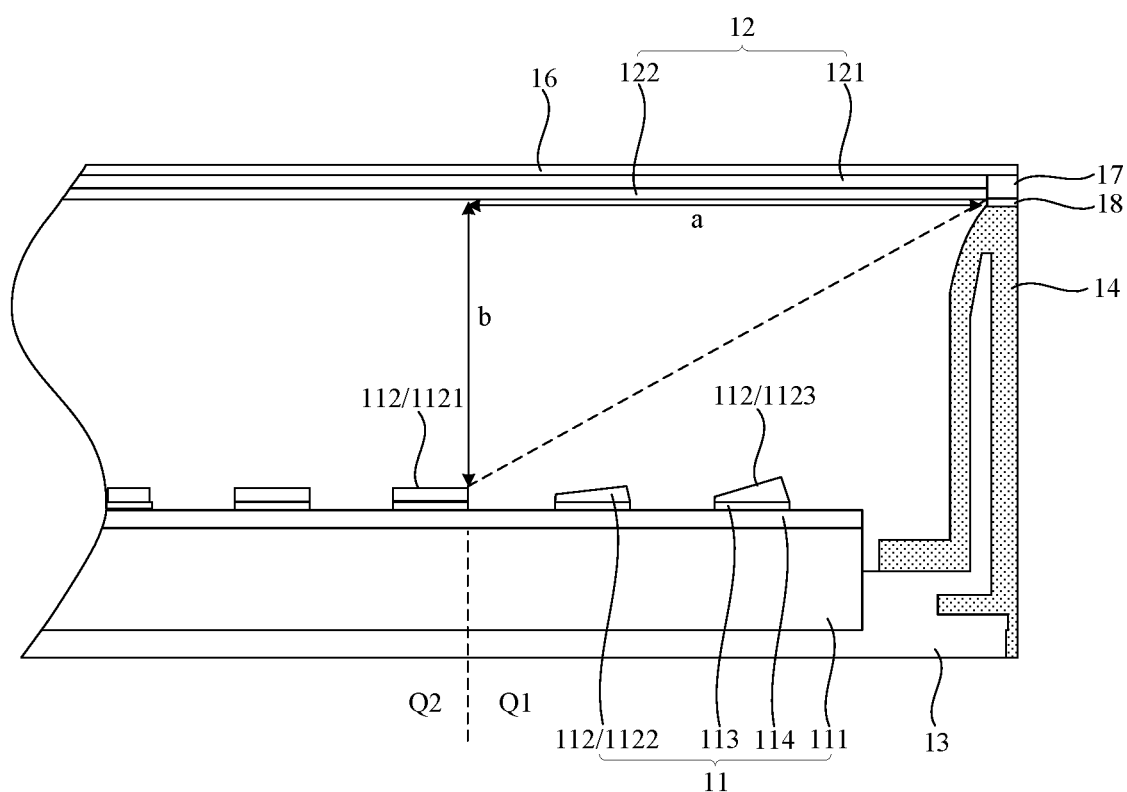
FIG. 7 is a schematic structural diagram of another light emitting module according to an embodiment of the present disclosure.

In this embodiment, as shown in FIG. 7, on the same side of the substrate 111, for each light source 1121 located in the second area Q2 and adjacent to the junction of the first area Q1 and the second area Q2, a first distance between a first vertex of the light source 1121 close to the first area Q1 and a surface of the optical film layer 12 facing the light source 1121 along the direction perpendicular to the substrate 111, a second distance between a projection of the first vertex on the optical film layer 12 and a first edge of the optical film layer 12, and a light emission angle of the light source 1121 satisfy the following relationship:

$$\arctan(a/b) \geq \varphi/2 \quad (1)$$

where a is the second distance, b is the first distance, and ci is the light emission angle of the light source 1121. The first vertex is the vertex of the light source 1121 facing the optical film layer 12. In this way, it can be ensured that the light of all the light sources 112 with the maximum emission angles just incidents on the outermost edge of the optical film layer 12, and no light leakage phenomenon occurs.

In this embodiment, the value range of b is 10~40 mm. The value of b can be set as desired.

In this embodiment, a is 70 mm, b=30 mm, arctan(a/b)=67 degrees, and the light emission angle of the light source 1121 is 120 degrees, that is, φ is equal to 120 degrees. It should be noted that, in at least one embodiment, the light emission angles of all the light sources 112 in the light emitting module are the same, for example, 120 degrees, but not limited thereto.

Figure 8:
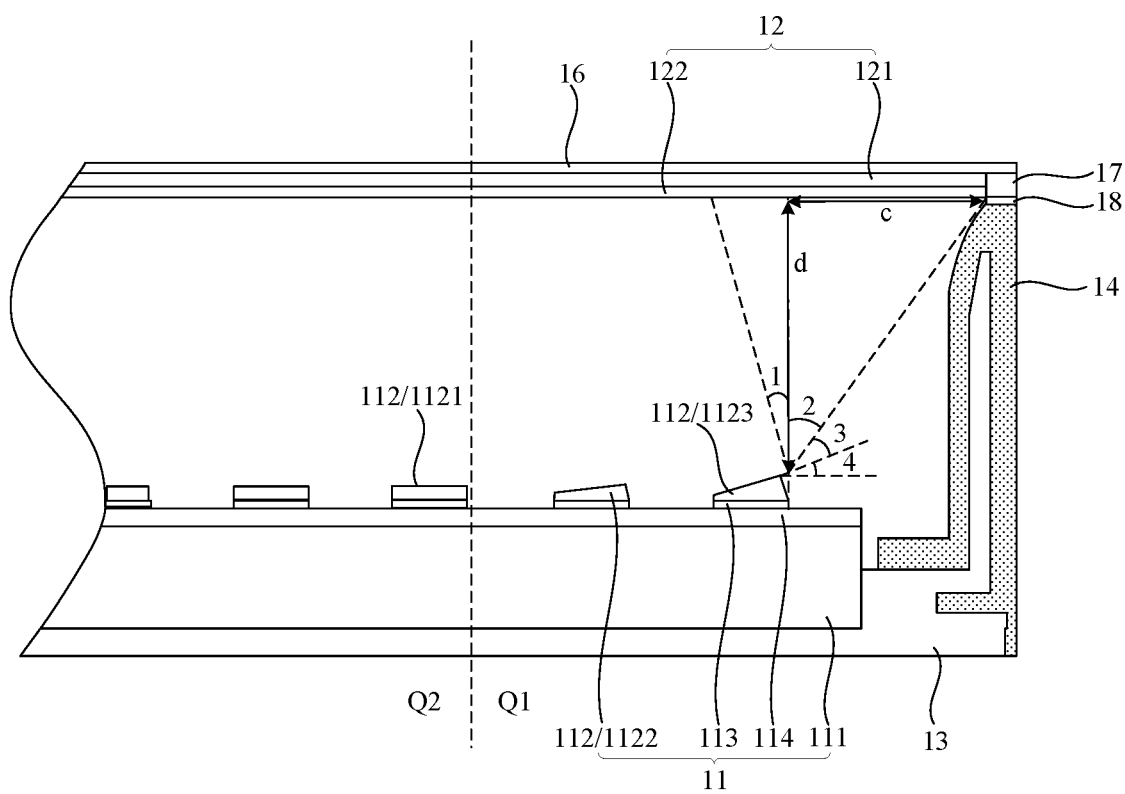
FIG. 8 is a schematic structural diagram of another light emitting module according to an embodiment of the present disclosure.

In this embodiment, as shown in FIG. 8, on the same side of the substrate 111, in the first area Q1, a third distance between a projection of an end of the light source 112 close to the first boundary B1 on the optical film layer 12 and a first edge of the optical film layer 12, a fourth distance between a second vertex of the light source 112 in the first area Q1 close to the first boundary and the surface of the optical film layer 12 facing the light source 112 along the direction perpendicular to the substrate 111, a light emission angle of the light source 112, and an inclination angle of the light emitting surface of the light source 112 satisfy the following relationship:

$$\arctan(c/d) + \psi = \varphi/2 \quad (2)$$

where c is the third distance, d is the fourth distance, w is the inclination angle of the light emitting surface of the light source 112, and φ is the light emission angle of the light source 112. The second vertex of the light source 112 close to the first boundary B1 is the vertex close to the first boundary B1 and facing the optical film layer 12. In FIG. 8, ∠4 is the inclination angle of the light emitting surface of the light source 112, and ∠1+∠2 is the light emission angle of the light source 112, that is, ∠1+∠2=φ/2, since ∠1+∠2+∠3=∠ 2+∠3+∠4=90°, therefore, ∠1=∠4=ψ.

In the present embodiment, for the light source 1123 in the first area Q1 close to the first boundary B1, the third distance between the projection of the end of the light source 1123 close to the first boundary B1 on the optical film layer 12 and the first edge of the optical film layer 12 is 32 mm, and the fourth distance between the second vertex of the light source 1123 close to the first boundary B1 and the optical film layer 12 is 30 mm, which can be calculated with a formula (2), ψ1=13°. In this way, it can be ensured that the light with the maximum emission angle of the light source 1123 just enters the outermost edge of the optical film layer 12 without light leakage. Moreover, the inclination angle of the light emitting surface of the light source 1123 can be made to be the maximum inclination angle that can realize mass production, thereby realizing mass production.

In this embodiment, for the light source 1122 in the first area Q1 that is away from the first boundary B1, the third distance between the projection of the end of the light source 1122 close to the first boundary B1 on the optical film layer 12 and the first edge of the optical film layer 12 is 43 mm, and the fourth distance between the second vertex of the light source 1122 close to the first boundary B1 and the optical film layer 12 is 30 mm, which can be calculated using formula (2), ψ2=5°. Compared with the light source 1123, the third distance of the light source 1122 has become larger, and the fourth distance has a small change, which can be regarded as unchanged. Therefore, the inclination angle of the light emitting surface can be reduced accordingly, and it can be still guaranteed that the light of the light source 1122 at the maximum light emission angle can still just incident on the outermost edge of the optical film layer 12 without light leakage.

In this embodiment, as shown in FIG. 1, the optical film layer 12 includes a diffusion layer 121 for diffusing the light emitted by the light source assembly 11 to make the light output uniform. The material of the diffusion layer 121 includes PMMA (polymethyl methacrylate) material, PC (polycarbonate) material or PS (polystyrene plastic) material, but not limited thereto. When the optical film layer 12 includes only the diffusion layer 121, the light emitted by the light sources 112 can be white light. In this way, the solution provided by the present disclosure can avoid the phenomenon of increased brightness at the edge of the light emitting module.

In this embodiment, as shown in FIG. 1, the optical film layer 12 can further include a light conversion layer 122, and the light conversion layer 122 is located on a side of the diffusion layer 121 close to the light sources 112, configured to convert light of a first wavelength into light of a second wavelength and light of a third wavelength, and allow part of the light of the first wavelength to pass through, so that the mixed light of the light of the first wavelength, the light of the second wavelength, and the light of the third wavelength passing through the light conversion layer 122 is white light. For example, the light of the first wavelength is blue light, and the light of the second wavelength and the light of the third wavelength are red light and green light, respectively. The light conversion layer 122 is used for converting blue light into red light and green light, and allows part of the blue light to pass through, so that the mixed light of blue light, red light and green light transmitted through the light conversion layer 122 is white light. In this way, the solution provided by the present disclosure can avoid the phenomenon of blue light or bluishness of the display screen caused by light leakage at the edge of the light emitting module.

In this embodiment, the light conversion layer 122 includes a quantum dot material. Quantum dot material includes III-V group compounds, such as cadmium-containing CdS (cadmium sulfide), CdSn (cadmium tin sulfide), etc. or cadmium-free ZnS (zinc sulfide), InP (indium phosphide), perovskite, etc.

In this embodiment, as shown in FIG. 1, the brightness enhancement film 16 is located on a side of the optical film layer 12 away from the light sources 112. The brightness enhancement film 16 can be a prismatic film for improving the brightness of light emission.

In this embodiment, as shown in FIG. 1, the plastic frame 14 is located on the back plate 13, the adhesive layer 18 is located between the water-oxygen barrier layer 17 and the plastic frame 14, and the material of the adhesive layer 18 is an opaque material, such as opaque glue. The water-oxygen barrier layer 17 is located between the brightness enhancement film 16 and the adhesive layer 18, for preventing water and oxygen from eroding the light conversion layer 122. The material of the water-oxygen barrier layer 17 is an opaque material. The adhesive layer 18 is opaque and the water-oxygen barrier layer 17 is opaque, which can reduce light leakage.

Figure 9:
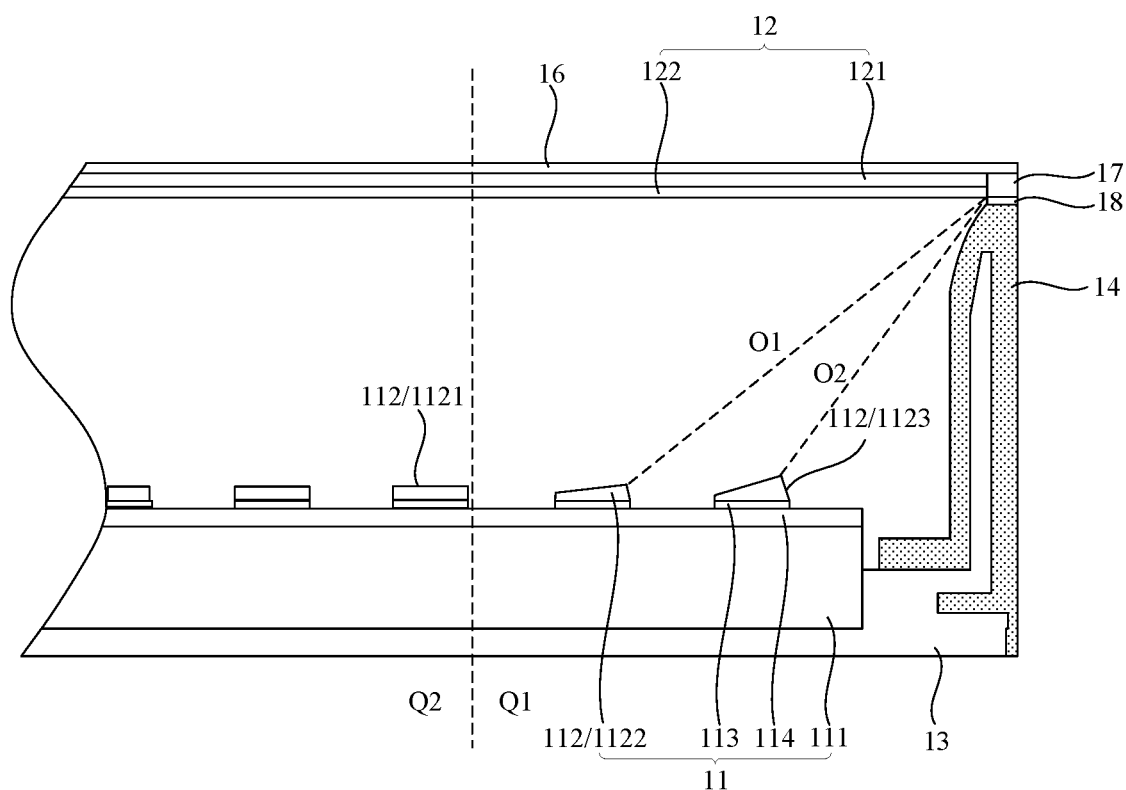
FIG. 9 is a schematic diagram of a light path of a light emitting module according to an embodiment of the present disclosure.

In this embodiment, the light emitting surfaces of some of the light sources 112 are inclined with respect to the surface of the substrate 111 facing the optical film layer 12. In some embodiments, the inclination of the light emitting surfaces of the light sources 112 with respect to the surface of the substrate 111 facing the optical film layer 12 can be implemented by special-shaped processing of the internal structure of the light source. This can be achieved, for example, by a bracket, a conductive pad, or at least one of the two. When the light emitting surfaces of the light sources 112 are inclined through brackets, in the first area Q1, the internal structures of the light sources 112 are the same, that is, no internal special-shaped processing is performed, and a height of a first end of the bracket 113 is lower than a height of a second end, so that the light emitting surfaces of the light sources 112 are inclined. When the light emitting surfaces of the light sources 112 are inclined through conductive pads, in the first area Q1, the internal structures of the light sources 112 are the same, and no internal special-shaped processing is performed. The light source assembly 11 further includes a conductive pad, the conductive pad is located below the second end of the bracket 113, and no conductive pad is provided below the first end of the bracket 113, so that the light emitting surface of the light source 112 is inclined In this embodiment, as shown in FIG. 9, it can be ensured that the light rays O1 and O2 of the maximum emission angles of all the light sources 112 just enter the outermost edge of the light conversion layer 122 without light leakage.

In this embodiment, there is no need to use color coating, and no need to use specially designed baffles and light-shielding films to block the light leaking from the edge of the light emitting module, which greatly reduces product costs and processes. In addition, the solution of this embodiment is more convenient for reassembly, convenient for disassembly and reassembly, and does not affect the performance of the product.

Figure 10:
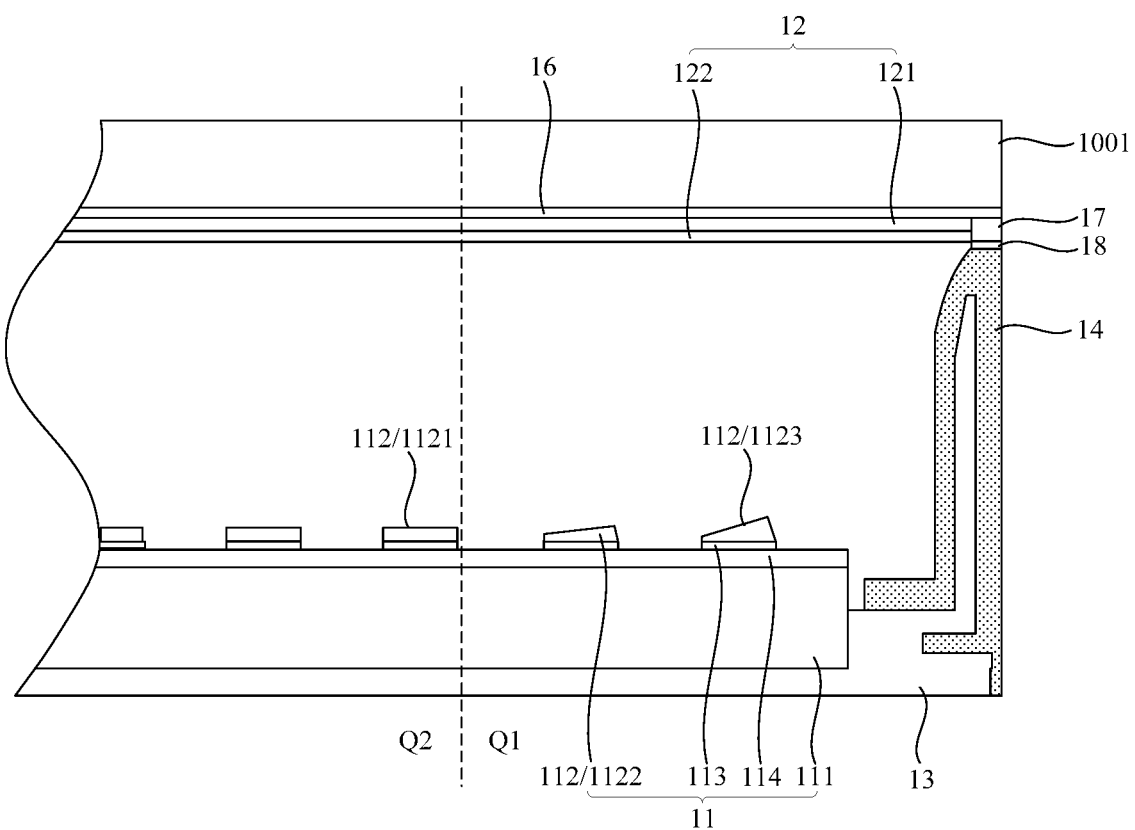
FIG. 10 is a schematic structural diagram of a display module according to an embodiment of the present disclosure.

An embodiment of the present disclosure also provides a display module. As shown in FIG. 10, the display module includes a display panel 1001 and also includes the light emitting module described in any of the above embodiments. The display panel 1001 is located on a side of the light emitting module away from the light source assembly 11.

In this embodiment, the display panel 1001 can be a liquid crystal display panel, but not limited thereto.

In this embodiment, since the first area Q1 surrounds the second area Q2, and the light emitting surfaces of the light sources located in the first area Q1 are inclined and face the second area Q2, light emitted by the light sources 112 located at the edge can is inclined to the center of the light emitting module, which can reduce the light at the edge of the light emitting module, thereby reducing the light leakage phenomenon at the edge of the light emitting module, which is beneficial to improve the display quality of the display module.

Although the present disclosure has been disclosed above, the present disclosure is not so limited. Any person skilled in the art can make various changes and modifications without departing from the spirit and scope of the present disclosure. Therefore, the protection scope of the present disclosure should be based on the scope defined by the claims.

The invention claimed is:

1. A light emitting module, comprising: a light source assembly;
wherein the light source assembly comprises a substrate and light sources, the light sources are located on the substrate, the substrate comprises a first area and a second area, the first area surrounds the second area, and light emitting surfaces of the light sources located in the first area are inclined and face the second area,
the light emitting module further comprises an optical film layer; wherein the optical film layer is located on a light exit side of the light source assembly, and is configured to modulate light emitted by the light source assembly; the light sources are located on a side of the substrate facing the optical film layer;
light emitting surfaces of the light sources located in the second area face the optical film layer and are parallel to a surface of the substrate facing the optical film layer;
on a same side of the substrate, for each of the light sources located in the second area and adjacent to a junction of the first area and the second area, a first distance between a first vertex of the light source close to the first area and a surface of the optical film layer facing the light source along a direction perpendicular to the substrate, a second distance between a projection of the first vertex on the optical film layer and a first edge of the optical film layer, and a light emission angle of the light source satisfy the following relationship:

$\arctan(a/b) \geq \phi/2$ where a is the second distance, b is the first distance, and $\phi$ is the light emission angle of the light source, wherein on the same side of the substrate in the first area, in a direction that a first boundary of the first area away from the second area points to a second boundary of the second area, at least two rows of light sources are provided, where the first boundary and the second boundary are adjacent to each other and extend in a same direction;

in the first area, an inclination angle of a light emitting surface of a light source close to the first boundary is larger than an inclination angle of a light emitting surface of a light source away from the first boundary, wherein the second area is rectangular;

in the first area, in each row of light sources, the light sources located on an extension line of a diagonal of the second area are inclined toward a center of the second area, and remaining light sources are inclined toward the center of the second area along one of a horizontal central axis and a vertical central axis of the second area which is perpendicular to an extending direction of the row where the light sources are located.

2. The light emitting module according to claim 1, wherein a $>\sqrt{3}b$.

3. The light emitting module according to claim 1, wherein in the first area, two rows of light sources are provided in a direction from the first boundary to the second boundary.

4. The light emitting module according to claim 1, wherein on the same side of the substrate, in the first area, a third distance between a projection of an end of the light source close to the first boundary on the optical film layer and the first edge of the optical film layer, a fourth distance between a second vertex of the light source in the first area close to the first boundary and the surface of the optical film layer facing the light source along the direction perpendicular to the substrate, a light emission angle of the light source, and an inclination angle of the light emitting surface of the light source satisfy the following relationship:

$$\arctan(c/d)+\psi=\phi/2$$

where c is the third distance, d is the fourth distance, $\psi$ is the inclination angle of the light emitting surface of the light source, and $\phi$ is the light emission angle of the light source.

5. The light emitting module according to claim 1, wherein the optical film layer comprises a diffusion layer, the light emitting module further comprises a back plate, a plastic frame, and an adhesive layer, and the light source assembly is located between the back plate and the diffusion layer, and on a side of the back plate facing the diffusion layer;

the plastic frame is located on the back plate, and the adhesive layer is located between the diffusion layer and the plastic frame;

the adhesive layer is made of an opaque material.

6. The light emitting module according to claim 5, wherein the light sources are configured to emit light of a first wavelength;

the optical film layer further comprises a light conversion layer, the light conversion layer is located on a side of the diffusion layer close to the light sources, and is configured to convert the light of the first wavelength into light of a second wavelength and light of a third wavelength and allow part of the light of the first wavelength to pass through, so that mixed light of the light of the first wavelength, the light of the second wavelength and the light of the third wavelength transmitted through the light conversion layer is white light.

7. The light emitting module according to claim 6, wherein the light conversion layer comprises quantum dot material.

8. The light emitting module according to claim 6, wherein the light emitting module further comprises a water-oxygen barrier layer; the water-oxygen barrier layer is located between the diffusion layer and the adhesive layer, and between the light conversion layer and the adhesive layer.

9. The light emitting module according to claim 1, further comprising a brightness enhancement film located on a side of the optical film layer away from the light sources.

10. The light emitting module according to claim 1, wherein the light source assembly further comprises a bracket and a circuit board, the circuit board is located between the substrate and the light sources, and the bracket is located between the circuit board and the light sources.

11. The light emitting module according to claim 10, wherein a height of a first end of the bracket is lower than a height of a second end, so that the light emitting surface of the light source is inclined.

12. A display module, comprising: the light emitting module according to claim 1 and a display panel, wherein the display panel is located on a side of the light emitting module away from the light source assembly.

13. The display module according to claim 12, wherein a $>\sqrt{3}b$.

14. The display module according to claim 12, wherein in the first area, two rows of light sources are provided in a direction from the first boundary to the second boundary.

15. The light emitting module according to claim 1, wherein a surface of the substrate close to the light sources in the first area is located in the same plane as a surface of the substrate close to the light sources in the second area.

* * * * *